(12) United States Patent
Kudo et al.

(10) Patent No.: US 6,809,497 B2
(45) Date of Patent: Oct. 26, 2004

(54) DRIVE UNIT FOR BRUSHLESS FAN MOTOR AND CONTROL METHOD THEREOF

(75) Inventors: Naruhiko Kudo, Toshima-ku (JP); Masato Murata, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/966,007

(22) Filed: Sep. 28, 2001

(65) Prior Publication Data

US 2002/0039014 A1 Apr. 4, 2002

(30) Foreign Application Priority Data

Sep. 29, 2000 (JP) .................................... 2000/300303

(51) Int. Cl.$^7$ .............................. H02P 1/24; H02P 1/42; H02P 3/18; H02P 5/28; H02P 7/36

(52) U.S. Cl. .................... 318/727; 318/254; 318/439; 318/738; 318/41; 318/34; 318/138; 323/271; 323/282

(58) Field of Search ............................ 318/727, 771, 318/772, 779, 111–113, 41, 798, 823, 91, 700, 715, 721, 254, 138, 268, 298, 439, 461–464, 599, 640, 720, 471–473, 800–811, 934; 323/271, 282; 361/51, 23, 115, 52; 388/809–819, 611, 934, 912; 417/22, 32, 44.1; 363/41, 56, 78, 98, 124

(56) References Cited

U.S. PATENT DOCUMENTS

| | | | |
|---|---|---|---|
| 3,986,086 A | * 10/1976 | Muller | 318/138 |
| 4,365,187 A | * 12/1982 | McDaniel et al. | 318/254 |
| 5,847,524 A | * 12/1998 | Erdman et al. | 318/439 |
| 5,942,866 A | 8/1999 | Hsieh | |
| 6,040,668 A | 3/2000 | Huynh et al. | |
| 6,135,718 A | 10/2000 | Yang | |
| 6,150,779 A | * 11/2000 | Itami et al. | 318/254 |
| 6,211,635 B1 | * 4/2001 | Kambe et al. | 318/254 |
| 6,215,262 B1 | * 4/2001 | Lim | 318/254 |
| 6,239,991 B1 | 5/2001 | Ajro et al. | |
| 6,256,181 B1 | * 7/2001 | Chinomi et al. | 361/23 |
| 6,262,549 B1 | 7/2001 | Yang et al. | |
| RE37,360 E | * 9/2001 | Duncan | 318/281 |
| 6,285,146 B1 | * 9/2001 | Harlan | 318/254 |
| 6,445,148 B2 | * 9/2002 | Huang et al. | 318/41 |

* cited by examiner

*Primary Examiner*—David Martin
*Assistant Examiner*—Renata McCloud
(74) *Attorney, Agent, or Firm*—Rankin, Hill, Porter & Clark LLP

(57) ABSTRACT

A drive unit for a brushless fan motor capable of easily controlling the rational speed of the motor without using PWM control. A power control circuit is provided for controlling the rational speed of the rotor by controlling the on/off operation of power feed semiconductor switch. The actual rotational speed of the rotor is compared with the target rotational speed. Based on the compared values, the turn-off time of the power feed semiconductor switch is controlled so that the rotational speed of the rotor may reach the target rotational speed fast and smoothly.

6 Claims, 4 Drawing Sheets

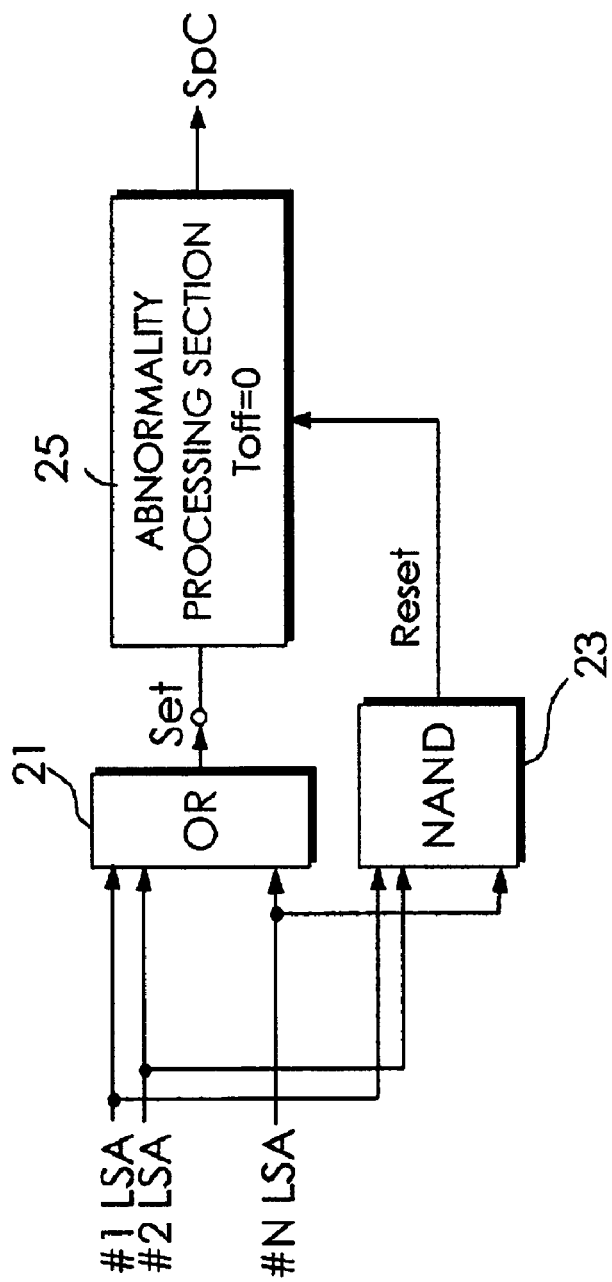

DRIVE UNIT FOR BRUSHLESS FAN MOTOR AND CONTROL METHOD THEREOF

BACKGROUND OF THE INVENTION

This invention relates to a drive unit for a brushless fan motor and control method therof.

A brushless fan motor generally includes a stator provided thereon with a plurality of excitation windings and a rotor including a plurality of rotor magnetic poles each constituted by a permanent magnet. The brushless fan motor thus generally constructed is driven and controlled by a drive unit. A drive unit which has been conventionally used for this purpose generally includes a position detector for detecting a position of the rotor, a rotational speed detecting means for detecting a rotational speed of the rotor, a plurality of excitation changing-over semiconductor switches each connected in series to each of the excitation windings so as to permit an excitation current to flow therethrough to the excitation winding when they are turned on, and a drive circuit for outputting an on/off change-over signal for each of the excitation changing-over semiconductor switches depending on an output of the position detector, a power feed semiconductor switch arranged between a plurality of excitation windings and a power supply so as to permit power to be fed from the power supply to exciting windings when it is turned on, and a power control circuit for controlling the rotational speed of the rotor by controlling the on/off operation of the power feed semiconductor switch. The conventional drive unit using PWM control generally includes a power control circuit provided with a triangle wave generating portion (triangle wave having a constant cycle). The slice level of the triangle wave is changed based on the value of the target rotational speed for the rotor given as the speed command to the power controlling circuit and the value of the actual rotational speed detected by the rotational speed detecting means. The change in the slice level of the triangle wave controls the pulse width of the signal controlling the on/off operation of the power feed semiconductor switches. The power fed to the excitation windings is varied by the on/off of the power feed semiconductor switches, thereby the speed of the brushless fan motor is controlled.

The conventional circuit controlling PWM is a complicated circuit and when such a control is executed with a micro computer, an expensive micro computer is necessary.

It is an object of the present invention to provide a drive unit for a brushless fan motor which is capable of easily controlling the speed of the fan motor without using PWM control.

SUMMARY OF THE INVENTION

The present invention has been made in view of the foregoing disadvantage of the prior art.

In accordance with the present invention, a drive unit for a brushless motor which includes a stator provided thereon with a plurality of excitation windings and a rotor including a plurality of rotor magnetic poles each constituted by a permanent magnet is provided. The drive unit generally includes a position detector for detecting a position of the rotor of the brushless fan motor, a rotational speed detecting means for detecting a rotational speed of the rotor, a plurality of excitation change-over semiconductor switches each connected in series to each of the excitation windings so as to permit an excitation current to flow therethrough to each of the excitation windings when it is turned on, and a drive circuit for outputting an on/off change-over signal for the excitation changing-over semiconductor switches depending on an output of the position detector. The drive unit further includes a power feed semiconductor switch arranged between a plurality of excitation windings and a power supply so as to feed power from power supply therethrough to excitation windings when it is turned on, a power control circuit for controlling the rotational speed of the rotor by controlling the on/off operation of the power feed semiconductor switch. The power control circuit controls the on/off operation of the power feed semiconductor switch based on the value of the target rotational speed given as a speed command and the value of the actual rotational speed obtained by the speed detection means.

In the present invention, the power control circuit is constructed in such a manner that after the rotational speed of the rotor is stabilized, the actual rotational speed of the rotor is compared with the target, rotational speed of the rotor. When the actual rotational speed of the rotor is slower than the target rotational speed of the rotor, the turn-off time of the power feed semiconductor switch is shortened. When the actual rotational speed of the rotor is faster than the target rotational speed of the rotor, the turn-off time of the power feeding semiconductor switch is lengthened, and when the actual rotational speed of the rotor is substantially equal to the target rotational speed of the rotor, the turn-off time of the power feeding semiconductor switch is kept at the same level as it is. Such a construction permits power fed from the power supply to excitation windings to be controlled and as a result the rotational speed of the brushless fan motor is controlled. When the turn-off time of the power feed semiconductor switch is varied, as in the present invention, according to the actual rotational speed of the rotor with respect to the target rotational speed of the rotor, the rotational speed of the rotor of the brushless fan motor can be easily controlled just as the power feed semiconductor switch is controlled under PWM control. If the change is only in turn-off time, such a change can be easily realized in either case of hardware power circuit or software power circuit, thus cost for such device can be reduced compared with before.

Just as rotational speed of the rotor can be controlled by changing the turn-off time of the power feed semiconductor switch, the rotational speed of the rotor can be controlled by changing the turn-on time of the power feed semiconductor switch.

Generally the hall device for detecting magnetic flux of a plurality of permanent magnets of the rotor is provided on the side of the stator. In the present invention, the position detector and the rotational speed detecting means may be constructed so as to detect the position of the rotor and the rotational speed of the rotor based on the output by the hall device.

It is possible that the rotation of the rotor is not stabilized and the rotational speed may not increase when the turn-off and turn-on time of the power feed semiconductor switch is changed from during the starting-up operation of the brushless fan motor. From such a view point, it is preferable that the turn-on time and the turn-off time of the power feed semiconductor switch in the power control circuit is set at a predetermined time respectively until the rotational speed of the rotor is stabilized.

For example, the rotation of a fan motor being stopped means a computer having the fan motor equipped therein being stopped, when a brushless fan motor is used for cooling a computer. Therefore, it is preferable that such a brushless fan motor is arranged so as not to stop as much as possible. Accordingly a power control circuit may be set in such a manner that the target rotational speed is normally set at a level (normal rotational speed) which is slower than a maximum rotational speed, and at a time point when a speed command is not detected, while power is being fed from the power supply, turn-off time is then set at zero (0) and the rotor is rotated at the maximum speed. Such an arrangement permits a brushless fan motor rotate with changeable rotational speed in a normal condition and is arranged to rotate at the maximum speed to prevent the temperature of the apparatus to be cooled from rising in an abnormal condition such as no speed command being detected.

Also it is preferable that the power feed semiconductor switch is turned off or an alarm is given when the rotational speed of a rotor does not reach or surpass the predetermined level after a speed command is entered while the power is being fed. Such an arrangement prevents excitation windings from being burned down in case of a failure in starting-up operation between the time points of starting power feeding and the rotational speed's reaching the predetermined level.

Furthermore, in the present Invention, a plurality of brushless fan motors are rotated at a normal speed which is slower than a maximum speed, and when at least one or more of the plural brushless fan motors are stopped, the remaining brushless fan motors are rotated at the maximum speed. Such an arrangement can prevent an overheating of electronic apparatus under an abnormal condition, in which, for example, at least one or more of the brushless fan motors are holted, by arranging the remaining brushless fan motors to rotate at a maximum speed and to blow enough air compasating the function of the holted brushless fan motors.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIG. 3 is a flow chart showing a control section for a plurality of brushless fan motors according to the present invention.

DETAILED DESCRIPTION OF THE PREFERRED EMBODIMENT

Now, a drive unit for a brushless fan motor according to the present invention will be described with reference to the accompanying drawings.

Figure 1:
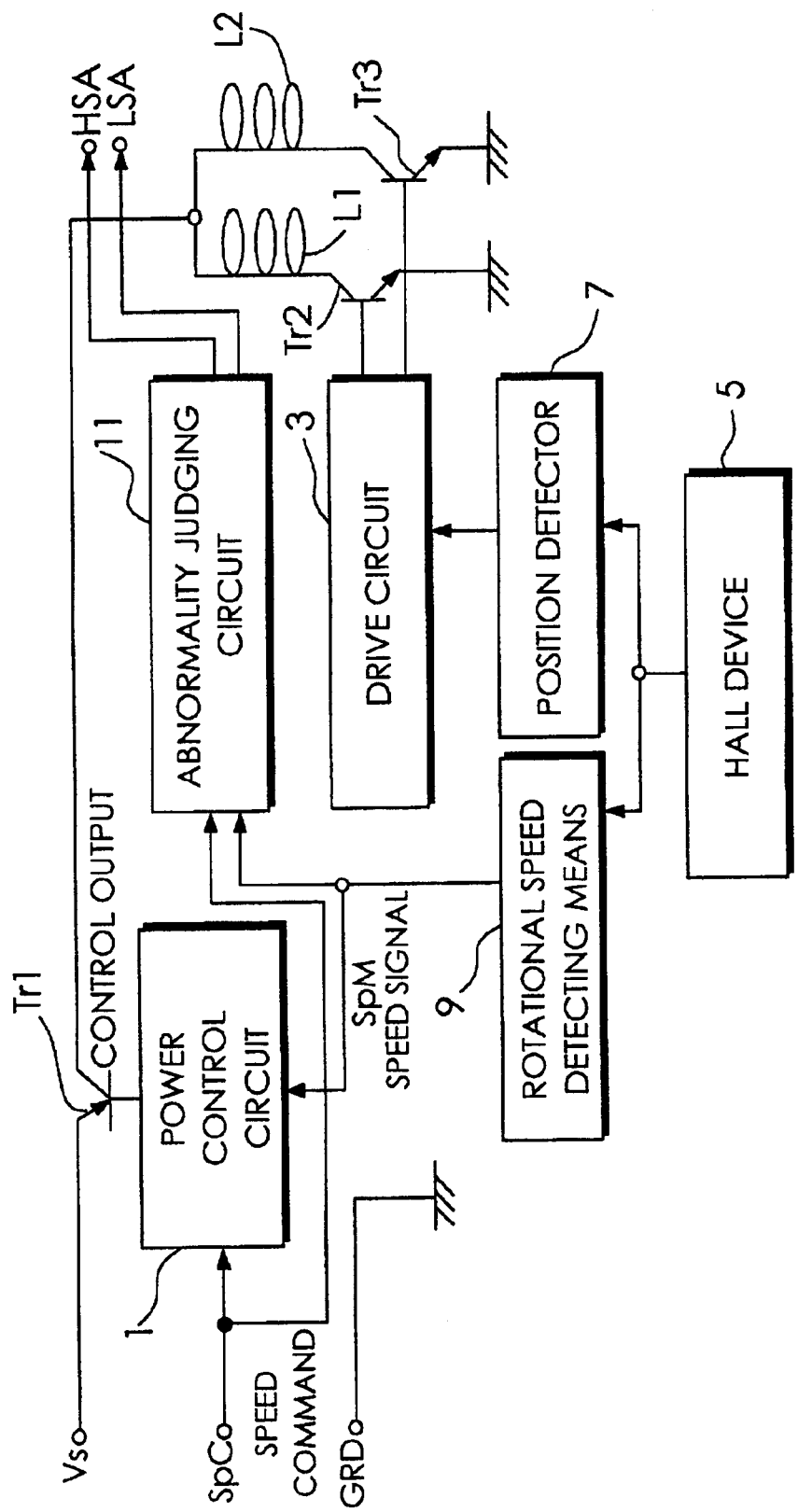
FIG. 1 is a schematic block diagram showing an embodiment of a drive unit for a brushless fan motor according to the present invention.

Referring first to FIG. 1, an embodiment of a drive unit for a brushless fan motor according to the present invention is illustrated. As commonly known in the art, conventionally a brushless fan motor is constituted by a stator including a plurality of winding sections and a rotor including a plurality of rotor magnetic poles. The winding sections of the stator each are formed by arranging each of excitation windings on each of plural magnetic pole sections (not shown). The rotor magnetic poles each are constituted by a permanent magnet. Flowing of an excitation current to each of the excitation windings of the stator of the brushless fan motor permits attraction force/repulsion force to be generated between the stator and the plural rotor magnetic poles of the rotor constituted by the permanent magnets, leading to rotation of the rotor of the brushless fan motor.

In FIG. 1, reference characters L1 and L2 designate a plurality of excitation windings of a stator. A drive unit for a brushless fan motor of the illustrated embodiment generally includes a power control circuit 1, a drive circuit 3, a hall device 5, a position detector 7, a rotational speed detecting means 9, an abnormality judging circuit 11, a power feed semiconductor switch Tr1, and excitation changing over semiconductor switches Tr2 and Tr3. The position detector 7 is adapted to detect positional relationship between a position of each of rotor magnetic poles of a rotor (not shown) which are constituted by permanent magnets and a position of each of stator magnetic poles of a stator each having an excitation winding wound thereon. The rotational speed detecting means 9 is arranged so as to detect a rotational speed of the rotor depending on an output of the hall device 5.

The excitation changing over semiconductor switches Tr2 and Tr3 are connected in series to the excitation windings L1 and L2 of the brushless fan motor, respectively. The excitation changing over semiconductor switches Tr2 and Tr3 permit an excitation current to flow to the excitation windings L1 and L2 when they are turned on, respectively. The drive circuit 3 is constructed so as to output an on/off change-over signal for the excitation changing over semiconductor switches Tr2 and Tr3 depending on an output of the position detector 7. The power feed semiconductor switch Tr1 permits power to be fed from a power supply Vs to the excitation windings L1 and L2 when it is turned on.

Also, in FIG. 1, reference character SpC designates a speed command, GRD is a ground, LSA is a low-speed alarm generated when rotation of the brushless fan motor does not reach a predetermined rotational speed, and HSA is a high-speed alarm informing that the motor is rotating at a maximum speed. After a rotational speed at which the rotor of the brushless fan motor is rotated is stabilized, comparison between an actual rotational speed of the rotor and a target rotational speed thereof is carried out. The actual rotational speed is obtained in the form of a speed signal SpM by detecting a rotational speed of the rotor through the hall device 5 by means of the rotational speed detecting means 9. The target rotational speed is given in the form of a speed command SpC. Then, the power control circuit 1 of the drive unit compares the speed signal SpM and speed command SpC with each other, to thereby generate a varied control output, resulting in on/off control of the power feed semiconductor switch Tr1 being carried out.

Figure 2:
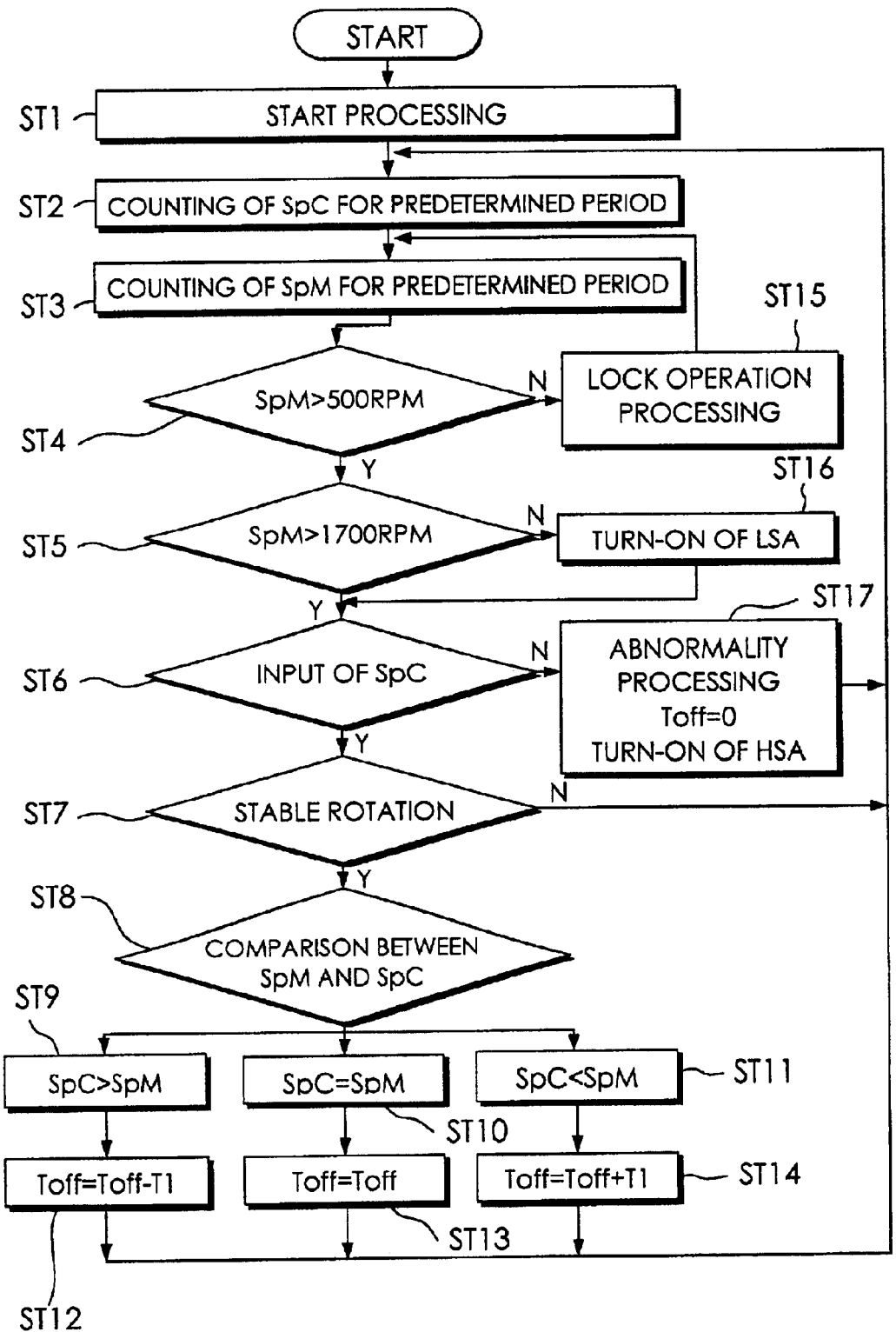
FIG. 2 is a flow chart showing an algorism of operation of the drive unit shown in FIG. 1.

Referring now to FIG. 2, an algorithm of a software used for realizing a control section of the drive unit for the brushless fan motor shown in FIG. 1 by means of a microcomputer is illustrated in the form of a flow chart. In the illustrated embodiment, a rotational speed of the rotor is controlled by varying turn-off time of the power feed semiconductor switch Tr1. In FIG. 2, start processing takes place in a step ST1, wherein the power supply is turned on and then the power feed semiconductor switch Tr1 is subjected to on/off control to gradually increase a rotational speed of the brushless fan motor.

In the step ST2, the speed command SpC is counted for a predetermined period of time, resulting in a value of the speed command SpC being known. During the time, the turn-off time and turn-on time of the power feed semiconductor switch Tr1 each are set at a predetermined fixed value until a rotational speed of the rotor is stabilized. Then, the operation is advanced to a step ST3. In the step ST3, the speed signal SpM is counted for a predetermined period of time, so that a value of the speed signal SpM may be known. In the step ST3 as well, the turn-off time and turn-on time of the power feed semiconductor switch Tr1 each are set at a predetermined fixed value until a rotational speed of the rotor is stabilized.

Then, the operation is advanced to steps ST4 to ST6, wherein a condition of rotation of the brushless fan motor is judged depending on the value of the speed signal SpM obtained in the step ST3. More particularly, in the step ST4, the brushless fan motor is judged to be in a locked condition when the speed signal SpM is at a level of, for example, 500 RPM or less, so that the operation is advanced to lock operation processing in a step ST 15, resulting in being returned to the step ST3. When the speed signal SpM exceeds, for example, 500 RPM, the brushless fan motor is judged to be in a condition of normal rotation, so that the operation is advanced to the step ST5. In the step ST5, judgment that the fan motor is delayed in rising of rotation thereof is made when the speed signal SpM is at a level of, for example, 1700 RPM or less, so that the operation is advanced to a step ST16. In the step ST16, the low-speed alarm LSA described above is outputted, resulting in the operation being advanced to the step ST6. Also when the speed signal SpM exceeds, for example, 1700 RPM, the operation is advanced to the step ST6. In the step ST6, input of the speed command SpC is checked. When the input is not detected, it is judged that abnormal processing is required, so that the operation is transferred to a step ST17, followed by returning to the step ST2.

Transfer to the step ST 17 is carried out, for example, when any abnormal condition in which the speed command is not inputted for any reason occurs, while the rotation is carried out at a normal rotational speed below a maximum speed under normal conditions with the turn-off time Toff being set at such a value as responding to such normal condition. When the brushless fan motor falls into such an abnormal condition on the other hand, the turn-off time Toff of the power feed semiconductor switch Tr1 is rendered zero, to thereby rotate the brushless fan motor at the maximum rotational speed. At this time, the high-speed alarm HSA is turned on, resulting in informing the abnormality.

When input of the speed command SpC is detected as a result of checking of the input in the step ST6, the operation is advanced to a step ST7. In the step ST7, it is judged whether the brushless fan motor falls into a condition of stable rotation. For example, the stability may be judged depending on whether or not a rotational speed of the fan motor reaches 250 rpm. When rotation of the fan motor is judged to be unstable, the operation is returned to the step ST2. When it is judged to be stable, the operation is advanced to a step ST8. In the step ST8, the speed command SpC and speed signal SpM obtained in the steps ST2 and ST3 are compared with each other. Then, the operation is advanced to any one of steps ST9 to ST11 depending on a result of the comparison. More particularly, when the speed command SpC is judged to be larger than the speed signal SpM as a result of comparison between both, the operation is advanced to the step ST9. In the step ST9, the turn-off time of the power feed semiconductor switch Tr1 is reduced by time T1. The time T1 may be set to be, for example, 2 $\mu$s or more. When the speed command SpC and speed signal SpM are judged to be equal to each other, the operation is advanced to the step ST10. In the step ST10, the turn-off time Toff of the power feed semiconductor switch Tr1 is kept unvaried. When the speed command SpC is judged to be smaller than the speed signal SpM, the operation is advanced to the step ST11. In the step ST11, the turn-off time Toff of the power feed semiconductor switch Tr1 is increased by the time T1. Then, when steps TS12 to TS14 are completed, the operation is returned to the step ST2. Speed control carried out in such a manner as described above permits the rotation to rapidly reach a target rotational speed. Also, it permits the rotation to be smoothly carried out while being reduced in overshoot after it reaches the target speed.

The illustrated embodiment, as described above, is so constructed that the turn-off time of the power feed semiconductor switch Tr1 is varied to control a rotational speed of the fan motor. Alternatively, in the illustrated embodiment, the turn-on time rather than the turn-off time may be varied to control the rotational speed. In this instance, in FIG. 2, the turn-on time Ton of the power feed semiconductor switch Tr1 is substituted for the turn-off time Toff thereof in the steps ST12 to ST14. Also, a sign of the time T1 is reversed. More specifically, a positive sign + is changed into a negative sign − and a negative sign − is changed into a positive sign +. Further, the turn-off time Toff=0 in the step ST17 is changed into the maximum turn-on tine Ton.

Referring now to FIG. 3, a control section which may be employed when a plurality of the brushless fan motors are connected in parallel to each other is illustrated. In FIG. 3, the plural fan motors each are rotated at a normal rotational speed slower than a maximum rotational speed, during which when at least one of the fan motors is stopped, the remaining fan motors are rotated at the maximum rotational speed. In FIG. 3, reference numeral 21 designates an OR circuit, 23 is a NAND circuit and 25 is an abnormality processing section. Low-speed alarms #1LSA, #2LSA . . . #NLSA are collected from the plural brushless motors (of N in number) and inputted to the OR circuit 21 and NAND circuit 23. An output of the OR circuit 21 indicates that an alarm is outputted from at least one of drive units and acts as a set signal for the abnormality processing section 25. An output from the NAND circuit 23 indicates that an alarm is outputted from none of the drive units and acts as a reset signal for the abnormality processing section 25. An output of the abnormality processing section 25 is transmitted in the form of the speed command SpC to all fan motors.

Figure 4A:
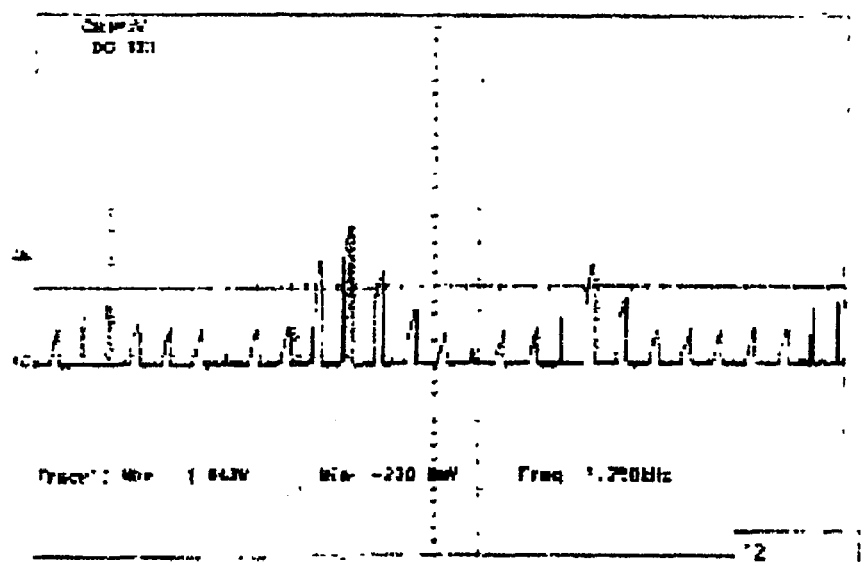
FIGS. 4A and 4B are representations showing current waveforms of the power feed semiconductor switch Tr1 while the drive unit is in operation.
Figure 4B:
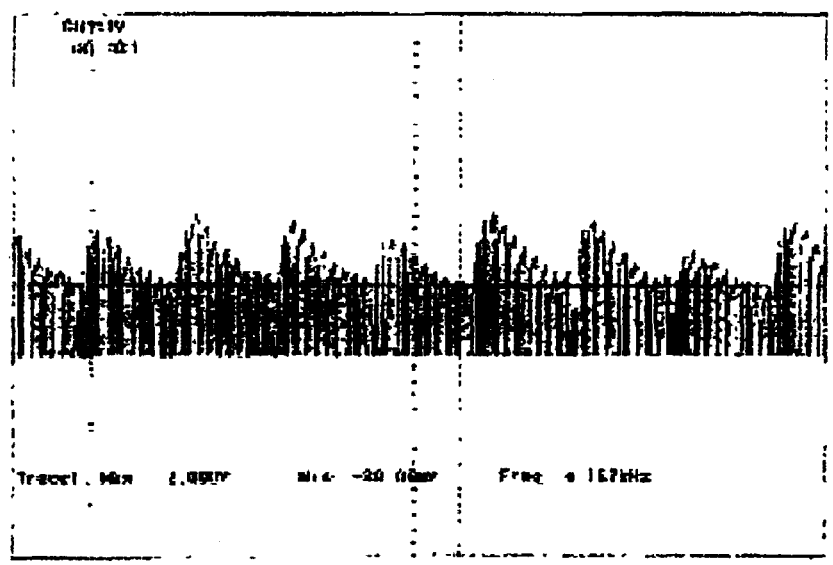

FIGS. 4A and 4B show the current waveform of power feed semiconductor switch TR1 during the operation; FIG. 4A is a waveform at a slow speed (2500 RPM) and FIG. 4B is a waveform at a high speed (6000 RPM).

In the present invention, the target speed of the brushless fan motor and actual speed of the brushless fan motor are compared in the power control circuit in which the rotational speed of the rotor is controlled by controlling the on/off operation of the power supply semiconductor switch. Such an arrangement permits the rotational speed of the rotor to reach the target speed fast and smoothly without using complicated and expensive PWM method.

In the present invention, a plurality of brushless fan motors are rotated at a speed (normal speed) which is slower than a maximum speed of respective fan motors. When at least one or more of the brushless fan motors are holted, the remaining fan motors are rotated at a respective maximum speed. Such an arrangement assures the reliability in the cooling performance for electronic apparatus.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A drive unit for a brushless fan motor including a stator provided thereon with a plurality of excitation windings and a rotor including a plurality of rotor magnetic poles each constituted by a permanent magnet, comprising:

a position detector for detecting a position of said rotor of the brushless fan motor;

a rotational speed detecting means for detecting a rotational speed of said rotor;

a plurality of excitation changing over semiconductor switches each connected in series to each of said excitation windings so as to permit an excitation current to flow therethrough to each of said excitation windings when they are turned on;

a drive circuit for outputting an on/off change-over signal for said excitation changing over semiconductor switches depending on an output of said position detector;

a power feed semiconductor switch arranged between said excitation windings and a power supply so as to permit power to be fed from said power supply therethrough to said excitation windings when it is turned on; and a power control circuit for outputting a control signal to control an on and off operation of said power feed semiconductor switch, thereby controlling the rotational speed of said rotor;

said power control circuit controlling the on/off operation of said power feed semiconductor switch based on a value of the target rotational speed of said rotor given as a speed command and an actual rotational speed obtained by said rotational speed detecting means;

said power control circuit being constructed so that after the rotational speed of said rotor is stabilized, said power feed semiconductor switch may have turn-off time set shorter when an actual rotational speed is slower, in comparison, than said target rotational speed, and set longer when the actual rotational speed is faster than said target rotational speed, and set as it is when an actual rotational speed is substantially equal to said target rotational speed.

2. The drive unit for a brushless fan motor as defined in claim 1, wherein a hall device for detecting a magnetic flux of said plural permanent magnets is provided on the side of said stator;

said position detector detects position and said rotational speed detecting means detects rotational speed of said rotor based on the output of said hall device.

3. The drive unit for a brushless fan motor as defined in claim 1, wherein, until the rotational speed of said rotor is stabilized, said turn-off time and said turn-on time of said power feed semiconductor switch is set at a predetermined value.

4. The drive unit for the brushless fan motor as defined in claim 1, wherein said power control circuit sets said target rotational speed at a normal rotational speed which is slower than a maximum rotational speed when said speed command is entered, and sets said turn-off time at zero (0) so as to rotate said rotor at said maximum speed, when said speed command is not entered while power is red from said power supply.

5. The drive unit for a brushless fan motor as defined in claim 1, wherein said power feed semiconductor switch is turned off or an alarm is given when the rotational speed of said rotor does not reach or surpass a predetermined rotational speed, after said speed command is entered.

6. A method to control a plurality of brushless fan motors, wherein the plurality of fan motors are set to rotate at a normal rotational speed which is slower than a maximum speed of each of the fan motors, and when at least one of said brushless fan motors is stopped, remaining ones of said plurality of brushless fan motors are set to rotate at the maximum speed.

* * * * *